Oct. 28, 1969       J. L. GOODELL       3,474,752
VEHICLE SPEED WARNING DEVICE
Filed Dec. 23, 1966
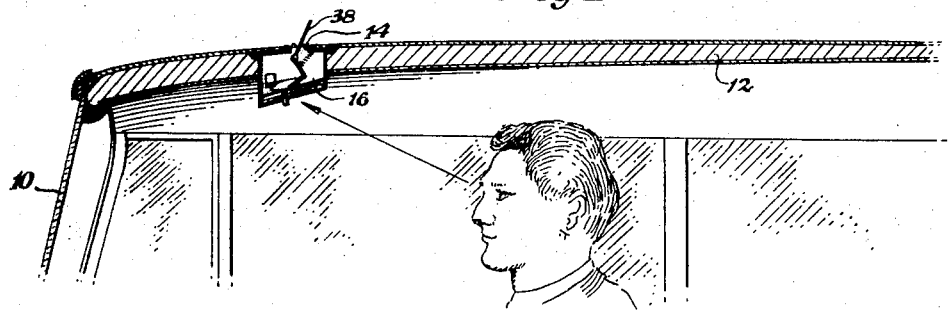
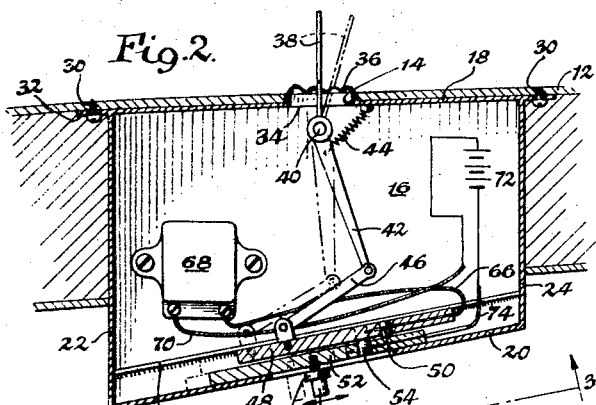
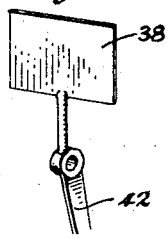
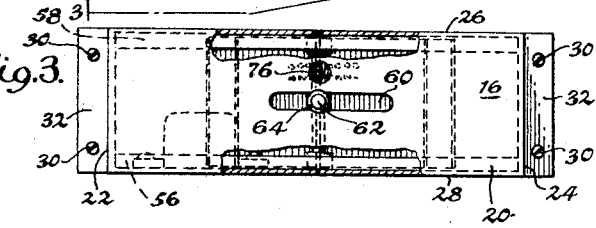
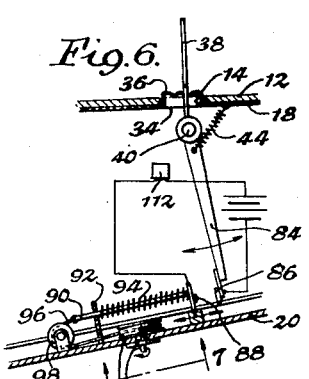
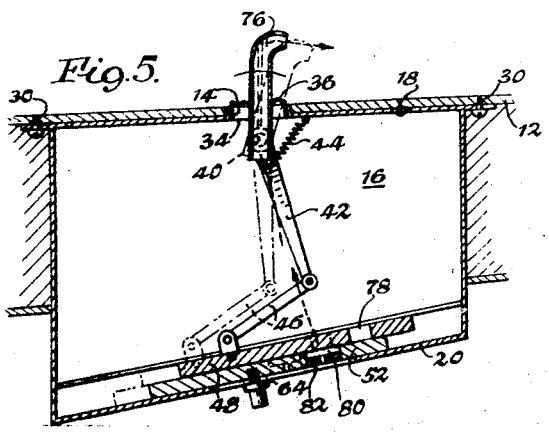
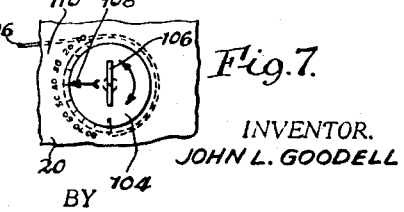
INVENTOR.
JOHN L. GOODELL
BY
Bean, Brooks, Buckley + Bean
ATTORNEYS United States Patent Office 3,474,752
Patented Oct. 28, 1969

3,474,752
VEHICLE SPEED WARNING DEVICE
John L. Goodell, Bemus Point, N.Y. 14712
Filed Dec. 23, 1966, Ser. No. 604,315
Int. Cl. B60q 1/54; G08b 21/00, 1/04
U.S. Cl. 116—28        4 Claims

ABSTRACT OF THE DISCLOSURE

A unitary package providing a vehicle speed warning device having an airstream operable inclinable vane extending above the roof of a vehicle, the warning signal utilizing either electric or air power.

BRIEF SUMMARY AND BACKGROUND OF THE INVENTION

The following patents are indicative of the state of the art relating to the general subject matter of this invention: 2,311,395, Feb. 15, 1943, 177–311.5; 2,628,345, Feb. 10, 1953, 340–54; 2,825,897, Mar. 4, 1958, 340–266; 2,963,694, Dec. 6, 1960, 340–263; 3,105,222, Sept. 24, 1963, 340–54.

The invention is adapted for use on vehicles of various types but particularly automobiles and trucks wherein the driver desires to be given a warning signal when a certain speed by the vehicle is attained in order that the driver may be alerted to reduce his speed or for other desired purposes.

Usually it would be immaterial that a speed warning be given at an exact speed and a warning at an approximate speed would be sufficient and it is for such purpose that the present invention has been developed.

It is known that some sophisticated devices for the same general purpose are on the market, but it is believed that they are generally controlled by a rotating part of the vehicle and require somewhat complicated electric and mechanical connections.

The present invention is directed to a unitary package wherein all elements necessary for the intended purpose are contained, and where the package can be attached to any existing vehicle with a minimum of alteration required in only one part of the vehicle. For example, only one reasonably small opening will need to be cut in the roof of a vehicle, and a few self tapping screws will be required to fasten the package to the underside of the roof. The roof opening will be weather closed preferably by a flexible membrane which is part of the package.

The package contains therein a relatively small vane intended to extend slightly above the vehicle roof into the airstream created by the forward motion of the vehicle, and also all linkage, electrical or pneumatic components necessary to furnish a warning signal. A manually pre-settable element, readily observable by, and within easy reach of the vehicle operator, is included in the package to permit predetermining the approximate speed at which a warning signal will be given.

The unitary package concept, its location, as well as its simplicity, and its unique combination of component parts is entirely missing from the background art.

In the drawing:

FIG. 1 is a diagrammatic view of the inside of a vehicle showing a partially sectioned side elevational view of on form of my invention as mounted in the roof of the vehicle;

FIG. 2 is an enlarged side elevation partly in section of the device of FIG. 1, including a schematic wiring diagram;

FIG. 3 is a partially cut away bottom elevation looking toward plane 3—3 of FIG. 2 in the direction of the arrows;

FIG. 4 is a view of the vane shown in FIGS. 1 and 2, and part of its arm;

FIG. 5 is a view similar to FIG. 2, but directed to a non-electrical form of the invention;

FIG. 6 is a partial side elevation partly in section showing a modification of the electrical contact arrangement and pre-set speed positioning portions; and FIG. 7 is a partial bottom elevation of the pre-set dial looking in the direction of the arrows 7—7 in FIG. 6.

In the drawing there is shown a portion of a vehicle such as an automobile, having a windshield 10, with a roof or top 12 with an opening 14 therein. The opening 14 is positioned between a driver's head and the windshield as shown in FIG. 1.

Adapted to be suspended from the roof 12 is a unitary case 16 having, as best shown in FIGS. 2 and 3, a top wall 18, a bottom wall 20, front and back walls 22 and 24, respectively and side walls 26 and 28.

The case may be firmly attached to the under side of the roof 12 by screws 30 passing through flanges 32 which may be an extension of the top wall 18.

Case 16 may be formed of any suitable material, such as sheet metal or plastic, but should be relatively rigid and provided in its top wall 18 with an opening 34 for substantial alignment with the opening 14.

Roof opening 14 is sealed from the weather by a weatherproof membrane or sheet 36 made of resilient material such as rubber which may be affixed to the edges of opening 34 by adhesives or in any other suitable manner.

A vane 38 extends through sheet 36 and is weather-sealed thereto, with a portion of the vane constituting a blade and intended to be in the normal airstream which flows from front to back over the vehicle roof when the vehicle is in motion, and a lower portion of the vane can be considered as a stem which is pivotally mounted on a pin 40, which pin is supported in the side walls 26 and 28 (FIG. 3). At its lower end vane 38 is provided with the arm 42, and is normally held in its solid line position as shown in FIGS. 2 and 5 by means of a tension spring 44.

The free end of arm 42 is pivotally connected to one end of a link 46, which link is pivotally connected at its other end to a slide contact or valve part.

Referring to FIG. 2, link 46 is connected to a slide 48 which has embedded therein a contact plug 50. A second slide 52 has a contact plug 54 and is positioned just below 48; and slides 48 and 52 are positioned between flanges 56 and 58 (FIG. 3) extending inwardly from walls 28 and 26, and the case bottom wall 20.

A slot 60 is provided in the bottom wall 20, and slide 52 has a pin 62 which extends through slot 60 so that the pin can be engaged by an operator's fingers. Pin 62 may have an enlarged portion 64 and a threaded inner end so that tightening of pin 62 will clamp the slot edges between the portion 64 and slide 52 and hold the slide in any set position.

The structure of FIG. 2 is completed by an electrical circuit of any desired type whereby a warning signal may be obtained. As shown, a wire 66 from contact 50 leads to a buzzer 68 which has a wire connection 70 to a battery 72 with a wire 74 therefrom to contact 54.

As shown in FIG. 3 the bottom wall 20 may have a sight opening 76 through which may be seen one number of a calibrated series of numbers located on the bottom of slide 52; the number representing an approximate vehicle speed.

In the operation of the invention the operator sets the slide 52 to show the approximate vehicle speed at which he desires to be warned. When the vehicle is moving, the airstream flowing over the roof will tilt the upper or blade end of the vane rearwardly against the resistance of spring 44 and in doing so the link 46 will move slide 48 forwardly until such time as the speed of the airstream tilts the vane sufficiently so that contact 50 touches contact 54 whereupon the electric circuit will be closed and the buzzer sounded. The dot-dash line position of the vane, arm, link and attached slide shows one action that may occur. Likewise the dot-dash line position of the lower slide illustrates one position in which that slide may be manually pre-set.

It should be obvious that after a warning has been sounded, and if a still higher speed is attained, the more rapid flow of the airstream will tilt the vane rearwardly to a greater degree, with the result that the vane arm and link will move slide 48 so that its contact 50 passes beyond its area of contact with contact 54 and the circuit will be broken and the warning will cease. The same condition would exist if the vane were to be held in its most rearward position, say by the weight of a build up of snow on the roof.

Referring now to the modification shown in FIG. 5. In this modification, instead of an electrical warning system, a pneumatic system is utilized. A vane 76 provides an air conduit open at its top and bottom and the case 16 is made air-tight. The slides 48 and 52 are provided with apertures 78 and 80, respectively, and mounted in one of the apertures, or in the vane conduit, is an air whistle, such as is shown in FIG. 5 at 82 in aperture 80. In operation, when vane 76 has been tilted by air flow so that it has shifted slide 48 to a position where aperture 78 and 80 register with each other, air is sucked out of the top of vane 76, through the case 16 and apertures 78 and 80 from the interior of the vehicle causing the whistle to blow. The approximate speed pre-set and other arrangements are substantially the same as described with respect to the apparatus of FIGS. 1, 2 and 3.

In the modification shown in FIGS. 6 and 7, the same case and vane structure is used as described with respect to FIGS. 1, 2 and 3; however a different form of electrical contacts and speed pre-set is used.

In FIGS. 6 and 7 the vane 38 is provided with an arm 84 which carries at its free end an electrical contact member 86. A second contact 88 constitutes one end of a rod 90 which rod passes through and is supported by a bracket 92 attached to any suitable part of the case. A spring 94 under compression is positioned around a part of rod 90 and bears against contact 88 and bracket 92. Attached to rod 90 is a cable 96 which passes over a pulley 98 suitably supported from the case, and the other end of the cable is wound around a drum 100. An axle 102 rigid with the drum, journals it in wall 20 and terminates in a disc 104 and finger piece 106. A pointer 108 may be supplied on the disc to point to an approximate pre-set speed which is arcuately indicated at 110 on wall 20 beyond the periphery of disc 104. A suitable electrical circuit is schematically shown and includes a warning element 112. The drum 100 and disc 104 can be so arranged as to frictionally grip wall 20 between them whereby the drum can be rotated only by manual rotation by means of finger piece 106.

In the operation of the device of FIGS. 6 and 7, by manually rotating finger piece 106 so that the end of arrow 108 points to a desired speed indication, the drum 100 is rotated thereby either loosening or taking up on cable 96 and positioning contact 88 a predetermined distance from contact 86. When the vehicle is moving and the airstream over the roof tilts the vane rearwardly, contact 86 will move toward contact 88, and if a predetermined approximate speed is reached the two contacts will touch closing the electrical circuit and activating the warning signal, and when the speed is reduced the contact will be broken.

It will be seen that this invention provides a packaged unit, wherein all necessary parts are included in the one package, and which may be easily installed in a vehicle, and provide an effective warning signal to the vehicle operator.

While this invention has been described with particular reference to the drawings herein, it will be obvious that variations would be possible without departing from the spirit of the invention.

What I claim as my invention is:

1. A vehicle speed warning device adapted to be suspended from the vehicle's roof and presettable to warn the vehicle operator when an approximate vehicle speed is attained, wherein the improvement comprises, a unitary casing having a top wall adapted to be fastened to the underside of a vehicle roof having an opening therein, said casing top wall having an opening registering with said roof opening.

a vane pivotally supported by said casing, said vane having a portion thereof extending outwardly from said casing through said registering top wall and roof openings and being movable with respect to said casing due to air pressure indicative of vehicle speed;

means forming a weatherproof seal between said vane portion and said top wall opening;

an electrically operable audible sound producing warning signal means;

a member movably mounted on said casing, said member including a manually rotatable drum in said casing and a cable attached to said drum;

means disposed within said casing and connected to said vane for movement therewith;

a first electrical contact carried by said vane connected means;

a second electrical contact carried by said cable; and an electrical circuit in said casing terminating in said contacts and adapted to effect actuation of said signal means when said contacts are moved into operative association, said drum when rotated acting through said cable to adjustably position said second contact in one of a plurality of positions relative to said casing indicative of vehicle speeds at which said signal means is to be actuated, said vane when pivoted being adapted to move said vane connected means to position said first electrical contact in operative association with said second electrical contact to effect actuation of said signal means.

2. A vehicle speed warning device adapted to be suspended from the vehicle's roof and presettable to warn the vehicle operator when an approximate vehicle speed is attained, wherein the improvement comprises, a unitary casing having a top wall adapted to be fastened to the underside of a vehicle roof having an opening therein, said casing top wall having an opening registering with said roof opening, said casing having a bottom wall and an elongated aperture therein;

a vane pivotally supported by said casing, said vane having a portion thereof extending outwardly from said casing through said registering top wall and roof openings and being movable with respect to said casing due to air pressure indicative of vehicle speed;

means forming a weatherproof seal between said vane portion and said top wall opening;

an electrically operable audible sound producing warning signal means;

a member movably mounted on said casing, said member being manually presettable in one of a plurality of positions relative to said casing indicative of vehicle speeds at which said signal means is to be actuated;

an arm rigidly attached at one end thereof to said vane;

a link;

a first slide mounted for sliding movement in said casing, said arm at its other end pivotally supporting a first end of said link, said link having a second end thereof pivotally connected to said first slide, said manually presettable member including a second slide disposed in frictional contact with said first slide and forming a closure for said bottom wall aperture;

first electrical contact means carried on said first slide;

second electrical contact means carried on said second slide and being adjustably positioned thereby inwardly of said casing; and an electrical circuit adapted to cause actuation of said signal means upon contact of said contact means, said contact means being adapted to contact each other upon movement of said first slide caused by said movement of said vane.

3. A vehicle speed warning device adapted to be suspended from the vehicle's roof and presettable to warn the vehicle operator when an approximate vehicle speed is attained, wherein the improvement comprises, a unitary casing having a top wall adapted to be fastened to the underside of a vehicle roof having an opening therein, said casing top wall having an opening registering with said roof opening, said casing having a bottom wall and an elongated aperture therein;

a vane pivotally supported by said casing, said vane having a portion thereof extending outwardly from said casing through said registering top wall and roof openings and being movable with respect to said casing due to air pressure indicative of vehicle speed;

means forming a weatherproof seal between said vane portion and said top wall opening;

a warning signal producing means in the form of an air whistle;

a member movably mounted on said casing, said member being manually presettable in one of a plurality of positions relative to said casing indicative of vehicle speeds at which said signal producing means is to be actuated;

an arm rigidly connected at one end thereof to said vane;

a link;

a first slide mounted for sliding movement in said casing, said arm at its other end pivotally supporting a first end of said link, said link having a second end thereof pivotally connected to said first slide, said manually presettable member including a second slide disposed in frictional contact with said first slide and forming a closure for said bottom wall aperture, said second slide having a restricted opening extending therethrough in registration with said bottom wall aperture, said first slide having a restricted opening extending therethrough and being adapted to register with said opening in said second slide when said vane is moved with respect to said casing; and means defining an opening between the interior of said casing and the outside of said vehicle, whereby air is caused to pass from the inside to the outside of said vehicle and operate said air whistle when said slide openings are in registration.

4. The speed warning device as defined in claim 3 in which said opening defining means is a conduit extending within said vane between the interior of said casing and the outside of said vehicle.

References Cited

UNITED STATES PATENTS

| 1,917,959 | 7/1933 | Eshbaugh | 116—57 |
| 2,244,983 | 6/1941 | Codde | 116—39 X |
| 3,187,134 | 6/1965 | Kock | 200—81.9 |
| 3,345,478 | 10/1967 | Hutchinson et al. | 200—81.9 |
| 3,355,560 | 11/1967 | Murphy et al. | 200—81.9 |

FOREIGN PATENTS

| 959,297 | 5/1964 | Great Britain. |
| 709,320 | 11/1930 | France. |

LOUIS R. PRINCE, Primary Examiner

DANIEL M. YASICH, Assistant Examiner

U.S. Cl. X.R.

116—65; 200—81.9; 340—241